US009609484B1

(12) United States Patent
Rodoper

(10) Patent No.: US 9,609,484 B1
(45) Date of Patent: Mar. 28, 2017

(54) APPROACHES FOR POSITIONING COMPUTING DEVICES

(71) Applicant: Amazon Technologies, Inc., Reno, NV (US)

(72) Inventor: Mete Rodoper, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/491,751

(22) Filed: Sep. 19, 2014

(51) Int. Cl.
| H04W 24/00 | (2009.01) |
| H04W 4/02 | (2009.01) |
| G06Q 30/02 | (2012.01) |
| G01S 5/02 | (2010.01) |

(52) U.S. Cl.
CPC .......... *H04W 4/028* (2013.01); *G01S 5/0284* (2013.01); *G06Q 30/0261* (2013.01); *H04W 4/023* (2013.01)

(58) Field of Classification Search
USPC ...................................................... 455/456.3
IPC ................... H04W 4/028,4/023; G01S 5/0284; G06Q 30/0261
See application file for complete search history.

(56) References Cited

U.S. PATENT DOCUMENTS

| 8,473,350 | B1 * | 6/2013 | Bouret | ................... G06Q 30/00 705/14.66 |
| 2013/0260790 | A1 * | 10/2013 | Itzhaki et al. | ............. 455/456.1 |
| 2015/0201028 | A1 * | 7/2015 | Hinnegan et al. | ...... H04L 67/18 |

\* cited by examiner

*Primary Examiner* — Tanmay Shah
(74) *Attorney, Agent, or Firm* — Seyfarth Shaw LLP; Ilan N. Barzilay; Tyrus S. Cartwright

(57) ABSTRACT

Electronic devices can be provided with access point sparse databases that include a listing of some or all known access points in a geographic region and the respective coordinates of those access points. The device can scan and identify the access points that are within range of the device. The device can reference the names of the detected access points with access point information included in the sparse database stored in the device to determine the coordinates of the detected access points. These coordinates provide an estimate as to the device's geographic position. The sparse database can also include data describing various actions that are triggered in response to the device being located in the geographic region. Thus, upon determining that the device is physically located in the geographic region, the device can perform or execute any actions that have been specified in the sparse database.

19 Claims, 10 Drawing Sheets

APPROACHES FOR POSITIONING COMPUTING DEVICES

BACKGROUND

As electronic devices, such as laptops, tablets, or smartphones, become increasingly sophisticated, new and interesting approaches have arisen for such devices to utilize location-based services to provide users with content and information. Some approaches for devices to determine their location include a global position system (GPS) receiver, cell phone tower triangulation, and WiFi positioning techniques. WiFi positioning can involve a device providing information describing WiFi access points within range of the device to a server. The server can access a database that includes a listing of known access points (APs) along with respective coordinates for those access points. Based on the known coordinates of the detected access points, the server can then determine an estimated location of the device.

BRIEF DESCRIPTION OF THE DRAWINGS

Various embodiments in accordance with the present disclosure will be described with reference to the drawings, in which.

DETAILED DESCRIPTION

Figure 1A:
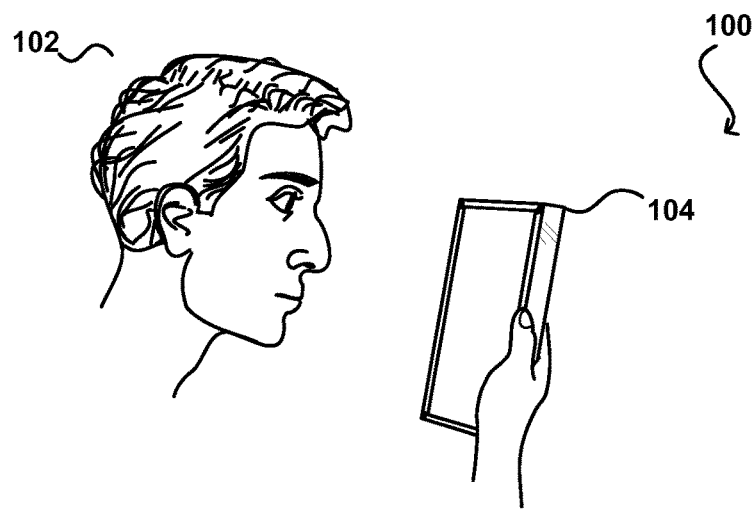
FIGS. 1(a) to 1(c) illustrate an example of generating a customized access point sparse database in accordance with various embodiments.

Systems and methods in accordance with various embodiments of the present disclosure may overcome one or more of the aforementioned and other deficiencies experienced in conventional approaches to providing location-based content to electronic devices that are limited to communicating using wireless network technology (e.g., WiFi technology). Typically, this includes devices that lack cellular or GPS hardware, or are experiencing poor connectivity using such hardware.

For example, to provide a user with location-based content on a global scale, the user's WiFi-enabled electronic device can be provided, over a wire or wirelessly, an access point sparse database that includes a listing of some or all known access points that are detectable worldwide, together with the respective coordinates of those access points. As the device is moved from geographic region to region, the device is able to scan and identify the access points that are within range of the device. The device can reference the names of the detected access points with the sparse database stored in the device to determine the coordinates of the detected access points. These coordinates provide an estimate as to the device's whereabouts. In some embodiments, the sparse database also includes data describing various actions that are triggered in response to the device being located in a particular geographic region. The sparse database can also be customized to include some or all known access points that are detectable within specific geographic regions along with respective actions to be performed on the device when the device detects any of the access points in the sparse database. These specific geographic regions can include, for example, popular regions (e.g., tourist destinations), points of interest, cities, states, countries, and/or covering all of the geographic regions in the world.

In one example, a sparse database can be customized for specific users by determining geographic information of locations that are visited or frequented by a user and generating a customized sparse database that includes a listing of some or all known access points that are detectable within the geographic regions frequented by the user. As mentioned, this sparse database can include data describing various actions to be triggered on the device in response to the device being in a particular region (e.g., display an advertisement on a display screen of the device). This specification refers to WiFi technology throughout as an example for ease of discussion. However, the approaches described herein can utilize any wireless technology including, for example, Bluetooth™, Bluetooth low energy, and ZigBee. Similarly, the approaches described herein can utilize any technology that allows computing devices to detect broadcasts (e.g., signals) from various sources. A sparse database on the computing device can include various associations of broadcasts to geographic coordinates (or regions). Thus, when the computing device detects a particular broadcast, the computing device can utilize the sparse database to determine a geographic location and, optionally, perform any actions that are associated with that geographic location, as specified in the sparse database.

Various other applications, processes and uses are presented below with respect to the various embodiments.

FIG. 1(a) illustrates an example 100 of a user 102 operating an electronic device 104 in accordance with various embodiments. Although a portable electronic device 104 (e.g., a smart phone, tablet, or e-book reader) is shown, it should be understood that other types of electronic devices capable of receiving, determining, and/or processing input can be used can utilize aspects of the various embodiments as should be apparent in light of the teachings and suggestions contained herein. In this example, the electronic device 104 is configured to communicate wirelessly with other computing devices through WiFi wireless technology. The device 104 is configured to detect WiFi access points that are within range of the device 104. The device 104 can also connect to any detected access points either automatically or based on input from the user 102. Access points can be any device (e.g., wireless routers, hotspot, antennas, etc.) that allow the device 104 to connect to a network (e.g., the Internet). Once connected to an access point, the device 104 is able to send and receive data through the network (e.g., the Internet). In some embodiments, devices that are capable of utilizing using other types of technologies (e.g., GPS) for location determination may be provided with an option to disable such functionality and to utilize the location determination techniques described herein.

Figure 1B:
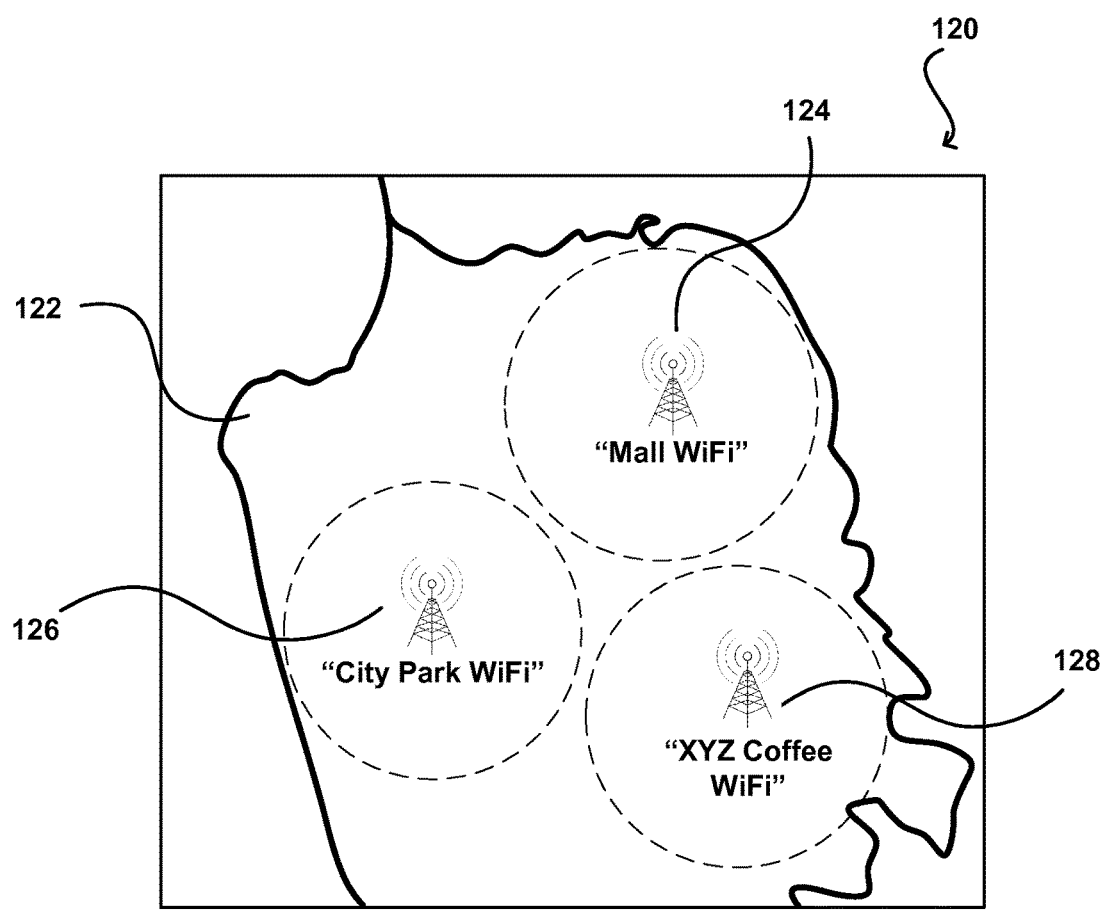

In some embodiments, the device 104 can be configured to collect data describing access points that are detected by the device 104, for example, in the geographic regions that the user 102 visits, as described in reference to the example situation 120 of FIG. 1(b). FIG. 1(b) shows a geographical map 122 illustrating access points "Mall WiFi" 124, "City Park WiFi" 126, and "XYZ Coffee WiFi" 128 that the device 104 detected and/or connected to at some point. The device 104 can be configured to collect data describing detected access points at specified time intervals (e.g., hourly or daily) or automatically, for example, anytime a new access point is detected by the device 104.

The device 104 can store information describing the names or identifiers of the detected access points 124, 126, and 128, respective timestamps of when the access points were detected, respective counts of how often any given access point was detected by the device 104, respective counts of how often the user 102 connected to any particular access point, among other things. Naturally, the user 102 can decide to opt-out of any automatic collection of data by configuring the device 104 to not collect such data. In some instances, the user 102 can manually provide information identifying geographic regions that the user 102 frequents or resides, for example, by inputting relevant addresses (e.g., home, work, etc.) in the device 104. In some embodiments, the relevant addresses can be determined based on geographic locations (e.g., home, work, etc.) to which the user 102 receives packages by mail (e.g., orders that were placed through an online marketplace). Data describing the user's orders (e.g., shipping addresses) can be stored in a user profile and this user profile can be utilized to determine the geographic locations.

Figure 1C:
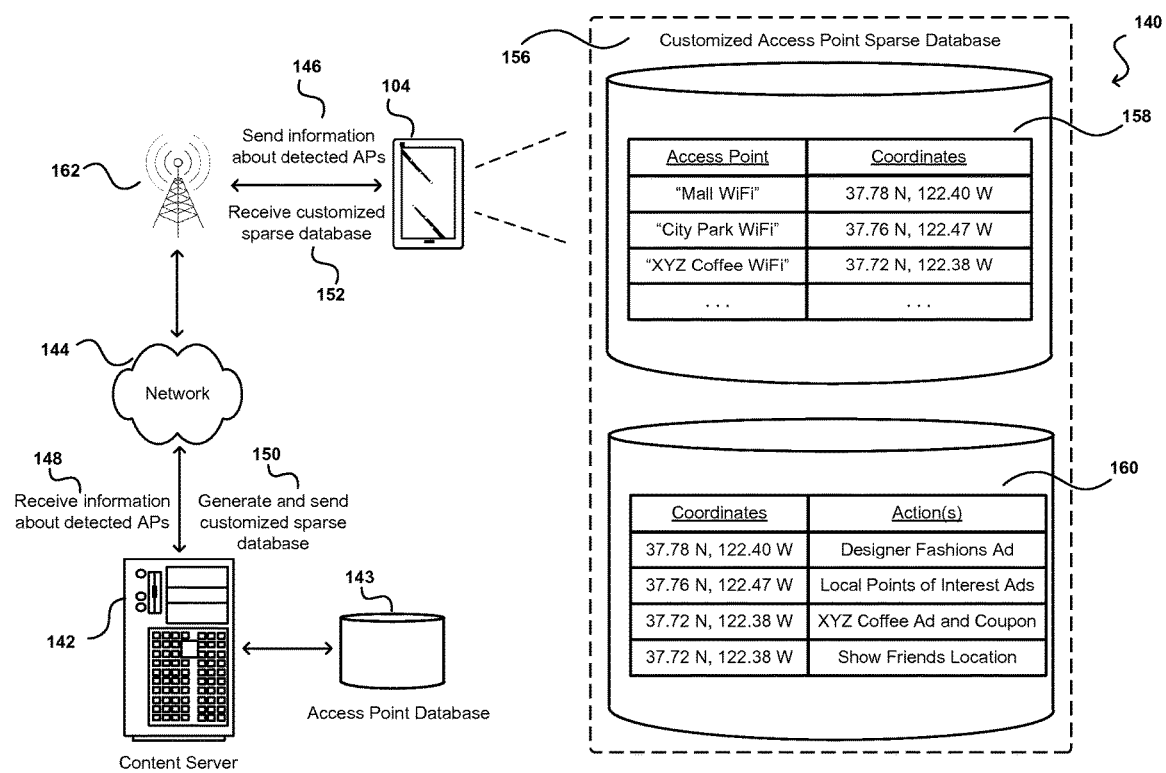

The device 104 can be configured to periodically send the collected data about detected access points to a content server 142, as described in reference to FIG. 1(c). As illustrated in the example situation 140 of FIG. 1(c), the device 104 can send the collected data 146 about detected access points to the content server 142 over the network 144 (e.g., the Internet) by connecting to an access point 162 (e.g., access point 124, 126, or 128). The content server 142 is configured to receive the collected data 148 and generate a customized access point sparse database 156 for the device 104. Although the term "database" is used in this example, the generated information can be stored using any data storage mechanism and no particular organization of the data is necessary.

The content server 142 can generate the sparse database 156 by matching names or identifiers of the access points that were detected by the device 104 against an access point database 143 that includes data describing known access points and their corresponding coordinates. For example, the content server 142 can attempt to match any names (e.g., SSID) of the detected access points or their corresponding media access control (MAC) addresses. If the content server 142 determines that a match exists in the database 143, then the content server 142 can include data describing the matching access point in the customized database 156. In some embodiments, in addition to matching an access point against the database 143, the content server 142 also evaluates how often the device 104 detected and/or connected to the access point. This evaluation can be used to determine one or more geofences that each describe a geographic region that the user visits, frequents, or resides in for some period of time (e.g., home, place of work, etc.). In such embodiments, the content server 142 can be configured to include, in the customized database 156, information identifying the access points that correspond to the geofences. In some implementations, access points are selected to be included in the customized database 156 when the number of times the device 104 detected and/or connected to the access point satisfies a threshold.

In some embodiments, the content server 142 includes, in the customized database 156, data describing the matching access point (e.g., name or identifier) and its corresponding coordinates (e.g., longitude and latitude) or any other means of identifying a geographic region covered by the matching access point. As illustrated in FIG. 1(c), the table 158 includes information identifying each access point (e.g., "Mall WiFi") along with at least one corresponding set of coordinates (e.g., "37.78 N, 122.40 W"). The table 158 shows only one set of coordinates associated with access points for ease of explanation. However, any given access point may be associated with number of sets of coordinates or a range of coordinates, for example, based at least in part on the geographic region in which an access point is detectable. Similarly, any given set of coordinates or range of coordinates may be associated with multiple access points.

The content server 142 can also include, in the customized database 156, data describing one or more actions that are triggered on the device 104 in response to the device 104 detecting or connecting to the matching access point. As illustrated in FIG. 1(c), the table 160 includes information identifying coordinates (e.g., "37.78 N, 122.40 W") along with at least one corresponding set of actions (e.g., "Designer Fashions Ad") to be performed by the device 104 when the device 104 is physically located within the specified coordinates (i.e., "37.78 N, 122.40 W"). The device 104 can determine when the device 104 is physically located within the specified coordinates by referencing the table 158 and determining that the specified coordinates correspond to the access point "Mall WiFi." Thus, anytime the device 104 detects and/or connects to the access point "Mall WiFi," the device 104 will perform the corresponding set of actions (i.e., "Designer Fashions Ad"). The table 160 shows only one set of coordinates associated with actions for ease of explanation. However, any given action may be associated with number of sets of coordinates or a range of coordinates, for example, based at least in part on the geographic region in which an action should be triggered. Similarly, any given set of coordinates or range of coordinates may be associated with multiple actions. Additionally, while FIG. 1(c) depicts the customized database 156 as having separate databases containing tables 158 and 160, this is simply for ease of explanation and the embodiments described herein do not require the database to be ordered or structured in any particular manner.

In some embodiments, actions associated with a geographic region are also associated with a corresponding geographic radius defining an area in which the action should be performed. In some embodiments, actions can be associated with time periods after which the actions are no longer performed. These time periods may be specified in terms of duration (e.g., hours, days, months, years, etc.) or a specific time or date.

In some embodiments, actions are associated with information identifying the types and/or models of devices in which the action can be triggered. For example, certain devices may not have the necessarily capability for executing a particular action. In such instances, this action can be associated with information describing the make or models of devices that are compatible with the action. When any device attempts to execute the action, the device can first determine whether the device's make or model is approved to perform the action using this information. In some embodiments, the content server 152 can simply determine the make or model of the device 104 and automatically exclude from the customized database 156 any actions that the device 104 is unable to perform.

Some examples of the types of actions that can be performed on the device 104 include displaying or sending content (e.g., a message, image, advertisement), making a call (e.g., a VoIP call), playing a sound (e.g., music or tune). In one example, the device 104 can display, on its display screen, location-specific content or information that relates to the geographic region in which the device 104 is located. The content can include, for example, books (e.g., travel guide) relating to the geographic region in which the device 104 is located.

FIG. 1(c) shows only one set of coordinates associated with access points and actions for ease of explanation. However, any given access point or action may be associated with number of sets of coordinates or a range of coordinates, for example, based at least in part on the geographic region in which an access point is detectable or the geographic region in which an action should be triggered. Similarly, any given set of coordinates or range of coordinates may be associated with multiple access points In some embodiments, the user 102 can interact with the content server 142 to specify or more actions to be performed in any given geographic region. For example, the device 104 may be used by the user's child and the user 102 may want a notification when the device 104 connects to a WiFi hotpot corresponding to the child's school. In this example, the user 102 can specify that the device 104 send a message or notification to another electronic device anytime the device 104 connects to the WiFi hotspot corresponding to the child's school.

Once the custom database 156 is generated, the content server 142 sends the custom database 156 over the network 144 to the device 104. The device 104 can then receive and store 152 and utilize the custom database 156 as described in reference to FIGS. 2-4. In some instances, the device 104 may no longer have wireless connectivity with the access point 162 when the custom database 156 is being sent. In such instances, the content server 142 can store the custom database 156 in a data store and can re-send the custom database 156 to the device 104 when a request (e.g., polling request) from the device 104 is received. The content server 142 can also be configured to re-attempt sending the custom database 156 to the device 104 at specified time intervals.

In some embodiments, the content server 142 is configured to generate updated sparse databases for the device 104 based on new information received from the device 104. For example, the user 102 may take the device 104 to a geographic region that the user 102 has previously not visited with the device 104. In this example, the device 104 may detect new access points in the new geographic region and send information describing the newly detected access points to the content server 142. Based at least in part on this new information, the content server 142 can update the customized database for the user to include information about the detected access points, their respective location information (e.g., coordinates), any actions to be performed at their respective locations, a respective geographic radius defining a region in which the action can, or is to be, performed, and/or information identifying devices (e.g., type, make, or model) on which the respective actions are able to be performed. The content server 142 can generate the updated sparse database at specified periods (e.g., hourly, daily, weekly, monthly, etc.). As mentioned, the content server 142 can push the updated sparse database to the device 104 or the device 104 can be configured to poll the content server 142 for any updates to the database anytime the device 104 connects to an access point or at specified time intervals. In some embodiments, rather than sending data describing the entire updated database, to conserve bandwidth, the content server 142 can be configured to determine any differences been the previously generated customized sparse database and the newly generated customized sparse database, and to send data describing the changes to the device 104.

Although FIGS. 1(a)-(c) describe approaches for generating and utilizing a customized sparse database 156, in some embodiments, the computing device 104 can be configured to utilize one or more static sparse databases for performing the approaches described herein. For example, a static database can be installed or loaded on the computing device 104 by some entity (e.g., the manufacturer of the computing device 104), for example, at the time of manufacture (e.g., factory installation). The static database can include some or all known access points that are detectable within specific geographic regions along with respective actions to be performed on the device when the device detects any of the access points in the sparse database. These specific geographic regions can include, for example, popular regions (e.g., tourist destinations), points of interest, cities, states, countries, and/or covering all of the geographic regions in the world.

Figure 2:
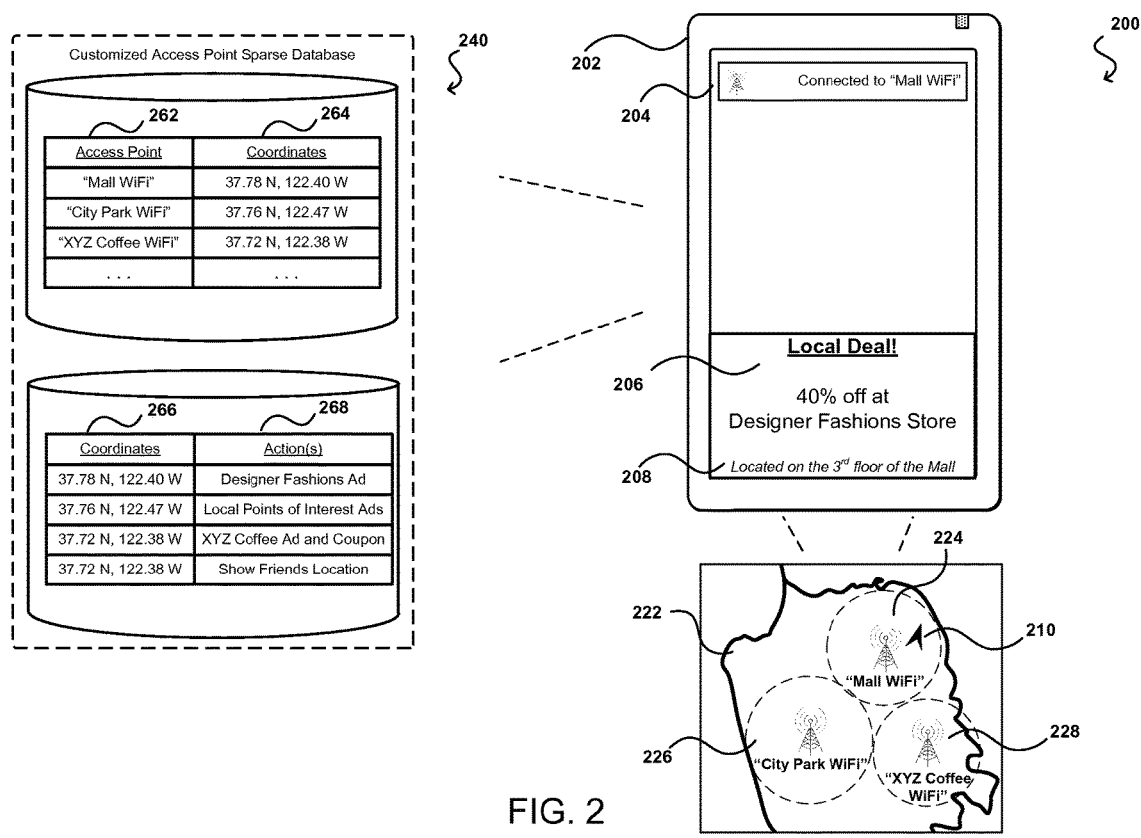
FIG. 2 illustrates an example of providing location-based content to a device in accordance with various embodiments.

FIG. 2 illustrates an example 200 of providing location-based content to a device 202 in accordance with various embodiments. For purposes of explanation, FIG. 2 depicts a geographical map 222 illustrating access points "Mall WiFi" 224, "City Park WiFi" 226, and "XYZ Coffee WiFi" 228 that are detectable within the geographic region in which the device 202 is located. As shown in the geographic map 222 using the indicator 210, in this example, the device 202 is located within range of the access point 224. Accordingly, in this example, FIG. 2 shows that the device 202 has detected and/or is connected to an access point "Mall WiFi" 224 as indicated on the display screen 204 of the device 202.

As mentioned, devices can be configured to access sparse databases that include information identifying various access points that are available to the device, respective location information (e.g., coordinates) for the access points, and respective actions to be performed when a device has detected and/or connected to an access point. In the example of FIG. 2, the device 202 is configured to utilize a customized access point sparse database 240 that can be stored on the device 202. The device 202 can be configured to utilize the database 240 to determine whether the device 202 needs to take any actions whenever the device 202 detects or connects to any of the access points 262 identified in the database 240.

As illustrated in FIG. 2, the database 240 includes information identifying access points 262 and their respective location information 264 (e.g., coordinates or range of coordinates). The database 240 also includes information correlating one or more actions 268 to particular locations 266 (e.g., coordinates or range of coordinates). The organization and structure of the database can vary depending on the implementation and the organization described in FIG. 2 is provided solely for explanatory purposes. Further, the information stored in the database 240 need not be stored in any particular database and can be stored using any data storage mechanism.

Although FIGS. 1(*a*)-(*c*) describe generating a customized sparse database for particular users or devices, in some embodiments, static sparse databases can be generated to provide certain functionality to the devices. For example, in some embodiments, a sparse database can be generated including some or all access points that are available (e.g., detectable or available for connection) throughout the world. Such a database can be utilized to provide devices with access to services and information in accordance with various embodiments. In some embodiments, devices can be configured to utilize the sparse database to provide offline services, such as offline maps. For example, whenever the device detects an access point, the device can reference the sparse database to determine its approximate geographic location and obtain map data for that geographic region. The content server 142 can generate updates for any of the various sparse databases described herein and provide the updates to devices as described throughout this specification.

In some embodiments, a sparse database can be generated to include some or all access points that are available in geographic regions that are determined to be popular. Popular geographic regions can include, for example, regions often visited by a user or users, tourist destinations, transportation hubs, such as airports or train stations, etc.). Such information can be used to provide users with location-based content. For example, when a user lands at an airport in a city or country that the user has not visited, the user's device can reference the sparse database to determine its approximate geographic location and obtain content specific to that city or country (e.g., maps, travel guides, food guides, currency information, hotel reservations, transportation options, etc.).

In some embodiments, a sparse database can be generated to include some or all access points that are available in geographic regions in which certain points of interest (e.g., museums, movie theatres, restaurants, etc.) are located. Such information can be used to provide users with location-based content, as described throughout this specification.

In some embodiments, a sparse database can be generated to include some or all access points that are available in geographic regions for which actions have been specified. For example, a franchise "XYZ Coffee" may want to have targeted advertisements sent to any device that detects or connects to access points that are near or associated with the franchise. In this example, the sparse database can be configured to include information describing some or all access points that are associated with a franchise "XYZ Coffee" along with data describing the targeted advertisements to be delivered to the devices. In this example, whenever a device detects an access point near or associated with the franchise "XYZ Coffee," the device can reference the sparse database to determine to display one or more targeted advertisements on the device.

In FIG. 2, when the device 202 detects and/or connects to the access point "Mall WiFi", the device 202 utilizes the database 240 to determine that the access point "Mall WiFi" corresponds to the coordinates "37.78 N, 122.40 W." The device 202 can then determine any actions that need to be performed or executed at the coordinates "37.78 N, 122.40 W." In this example, the device 202 determines that the coordinates "37.78 N, 122.40 W" correspond to an action "Designer Fashions Ad" instructs the device 202 to display an advertisement 206 informing the user operating the device 202 of a sale at a nearby store along with additional information 208, for example, travel directions to the store at which the sale is occurring. Naturally, the content provided to the device 202 can be customized for the user operating the device 202. The content may be customized using various techniques that evaluate the user's shopping habits, search history, frequently visited geographic locations, to name some examples.

Figure 3:
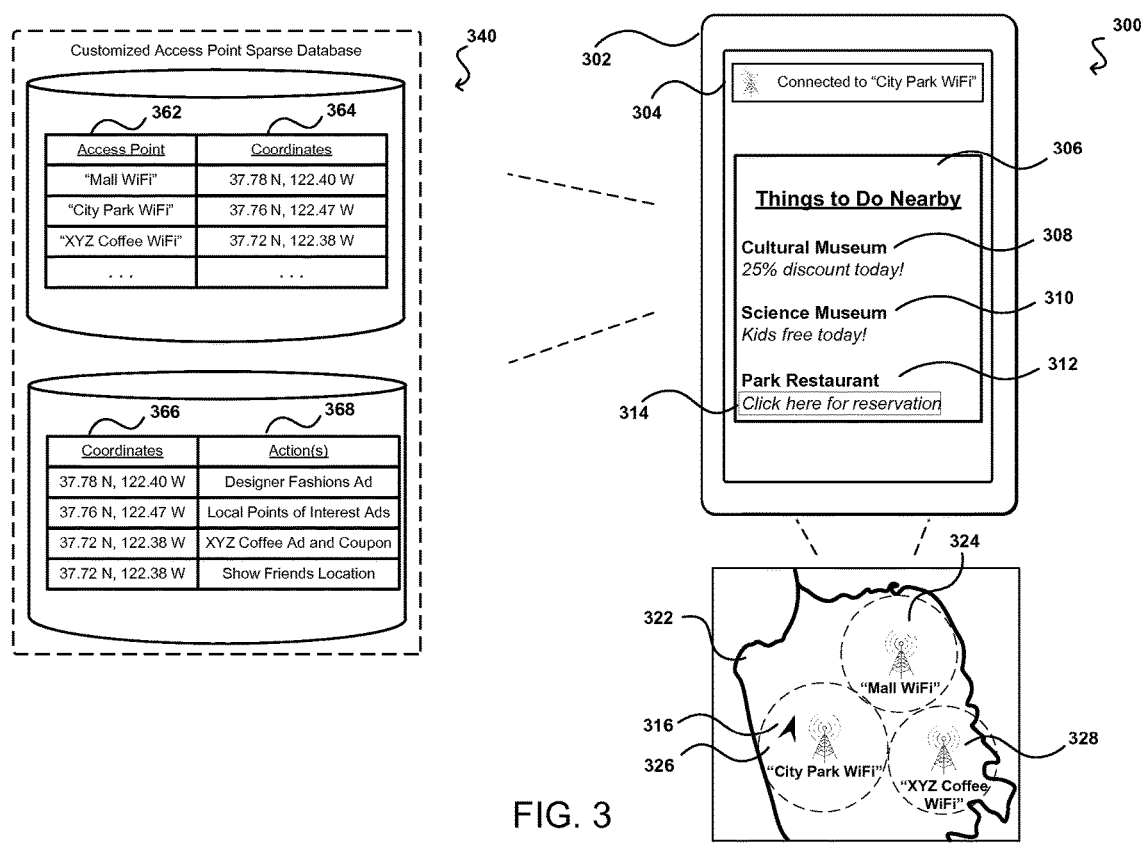
FIG. 3 illustrates another example of providing location-based content to a device in accordance with various embodiments.

FIG. 3 illustrates an example 300 of providing location-based content to a device 302 in accordance with various embodiments. For purposes of explanation, FIG. 3 depicts a geographical map 322 illustrating access points "Mall WiFi" 324, "City Park WiFi" 326, and "XYZ Coffee WiFi" 328 that are detectable within the geographic region in which the device 302 is located. As shown in the geographic map 322 using the indicator 316, in this example, the device 302 is located within range of the access point 326. Accordingly, in this example, FIG. 3 shows that the device 302 has detected and/or is connected to an access point "City Park WiFi" 326 as indicated on the display screen 304 of the device 302.

In the example of FIG. 3, the device 302 is configured to utilize a customized access point sparse database 340 that can be stored on the device 302. The device 302 can be configured to utilize the database 340 to determine whether the device 302 needs to take any actions whenever the device 302 detects or connects to any of the access points 362 identified in the database 240.

As illustrated in FIG. 3, the database 340 includes information identifying access points 362 and their respective location information 364 (e.g., coordinates or range of coordinates). The database 340 also includes information correlating one or more actions 368 to particular locations 366 (e.g., coordinates or range of coordinates). The organization and structure of the database can vary depending on the implementation and the organization described in FIG. 3 is provided solely for explanatory purposes. Further, the information stored in the database 340 need not be stored in any particular database and can be stored using any data storage mechanism.

In FIG. 3, when the device 302 detects and/or connects to the access point "City Park WiFi", the device 302 utilizes the database 340 to determine that the access point "City Park WiFi" corresponds to the coordinates "37.76 N, 122.47 W." The device 302 can then determine any actions that need to be performed or executed at the coordinates "37.76 N, 122.47 W." In this example, the device 302 determines that the coordinates "37.76 N, 122.47 W" correspond to an action "Local Points of Interest Ad" instructs the device 302 to display information 306 identifying points of interest that are near the device 302. In this example, the information 306 indicates that a cultural museum is nearby 308 and shows an advertisement for a 25 percent discount off admission to the museum. The information 306 also indicates that a science museum is nearby and shows an advertisement for the museum (i.e., "Kids free today!"). Additionally, the information 306 indicates that a restaurant 312 is nearby (i.e., "Park Restaurant") and provides an option 314 for making a reservation with the restaurant. Other options can be included in the information 306 depending on the action or actions associated with a geographic location. For example, the information 306 can also include options for calling a place of business for any of the points of interest, purchasing tickets for the points of interest, getting directions for any of the points of interests, to name a few examples. As mentioned, the content provided to the device 302 can be customized for the user operating the device 302. The content may be customized using various techniques that evaluate the user's shopping habits, search history, frequently visited geographic locations, to name some examples.

Figure 4:
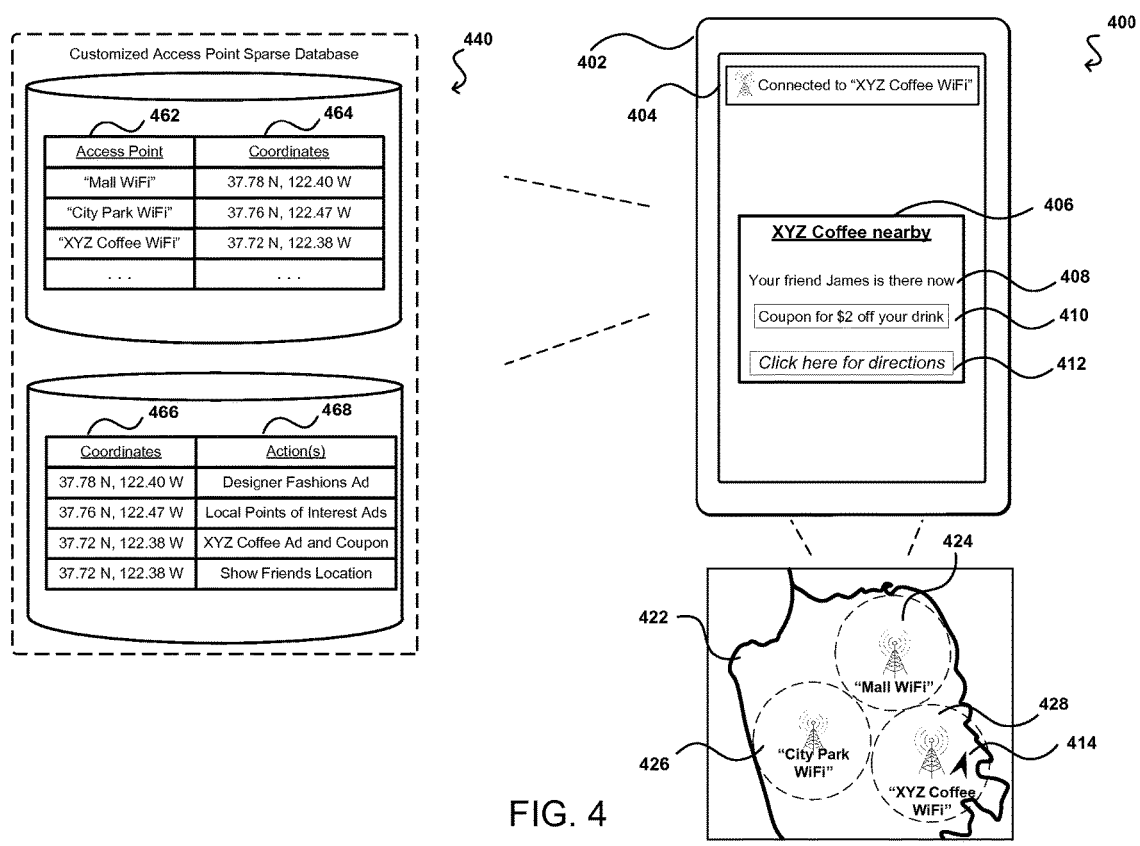
FIG. 4 illustrates another example of providing location-based content to a device in accordance with various embodiments.

FIG. 4 illustrates an example 400 of providing location-based content to a device 402 in accordance with various embodiments. For purposes of explanation, FIG. 4 depicts a geographical map 422 illustrating access points "Mall WiFi" 424, "City Park WiFi" 426, and "XYZ Coffee WiFi" 428 that are detectable within the geographic region 422 in which the device 402 is located. As shown in the geographic map 422 using the indicator 414, in this example, the device 402 is located within range of the access point 426. Accordingly, in this example, FIG. 4 shows that the device 402 has detected and/or is connected to an access point "XYZ Coffee WiFi" 428 as indicated on the display screen 404 of the device 402.

In the example of FIG. 4, the device 402 is configured to utilize a customized access point sparse database 440 that can be stored on the device 402. The device 402 can be configured to utilize the database 440 to determine whether the device 402 needs to take any actions whenever the device 402 detects or connects to any of the access points 462 identified in the database 440.

As illustrated in FIG. 4, the database 440 includes information identifying access points 462 and their respective location information 464 (e.g., coordinates or range of coordinates). The database 440 also includes information correlating one or more actions 468 to particular locations 466 (e.g., coordinates or range of coordinates). The organization and structure of the database can vary depending on the implementation and the organization described in FIG. 4 is provided solely for explanatory purposes. Further, the information stored in the database 440 need not be stored in any particular database and can be stored using any data storage mechanism.

In FIG. 4, when the device 402 detects and/or connects to the access point "XYZ Coffee WiFi", the device 402 utilizes the database 440 to determine that the access point "XYZ Coffee WiFi" corresponds to the coordinates "37.72 N, 122.38 W." The device 402 can then determine any actions that need to be performed or executed at the coordinates "37.72 N, 122.38 W." In this example, the device 402 determines that the coordinates "37.72 N, 122.38 W" correspond to an action "XYZ Coffee Ad and Coupon" that instructs the device 402 to display information 406 indicating that an XYZ Coffee shop is located near the position of the device 402 along with a coupon that the user operating the device 402 can use at the XYZ Coffee shop (i.e., "Coupon for $2 off your drink"). The user operating the device 402 can select an option 410 for opening the coupon which can be presented to a cashier at the XYZ Coffee shop. The user operating the device 402 can also select options to perform additional operations. In the example of FIG. 4, the user can interact with the device 402 to select an option 412 to obtain travel directions to get to the XYZ Coffee shop.

The device 402 also determines that the coordinates "37.72 N, 122.38 W" correspond to another action "Show Friends Location" that instructs the device 402 to display information 408 notifying the user operating the device 402 of any friends that are presented at the XYZ Coffee shop. Such features can be enabled, for example, when the user's friends have authorized sharing of their respective locations and users have the option of opting out of any location sharing or determination. As mentioned, the content provided to the device 202 can be customized for the user operating the device 202. The content may be customized using various techniques that evaluate the user's shopping habits, search history, geographic location, to name some examples.

In some instances, multiple actions defined for a geographic location may conflict with one another. Similarly, in some instances, the device may be positioned in a geographic location that overlaps with multiple access points or geofences that are each associated with respective actions. In such instances, the device may only be able to perform one of the conflicting actions. To resolve the conflict, the device can, for example, perform one of the conflicting actions for a specified duration or number of times and then performing the other conflicting action thereafter. Other approaches for resolving such conflicts are possible. For example, the device can take turns performing actions and such actions can be associated with respective priority scores that the device can utilize to prioritize the order in which the actions are performed.

Figure 5:
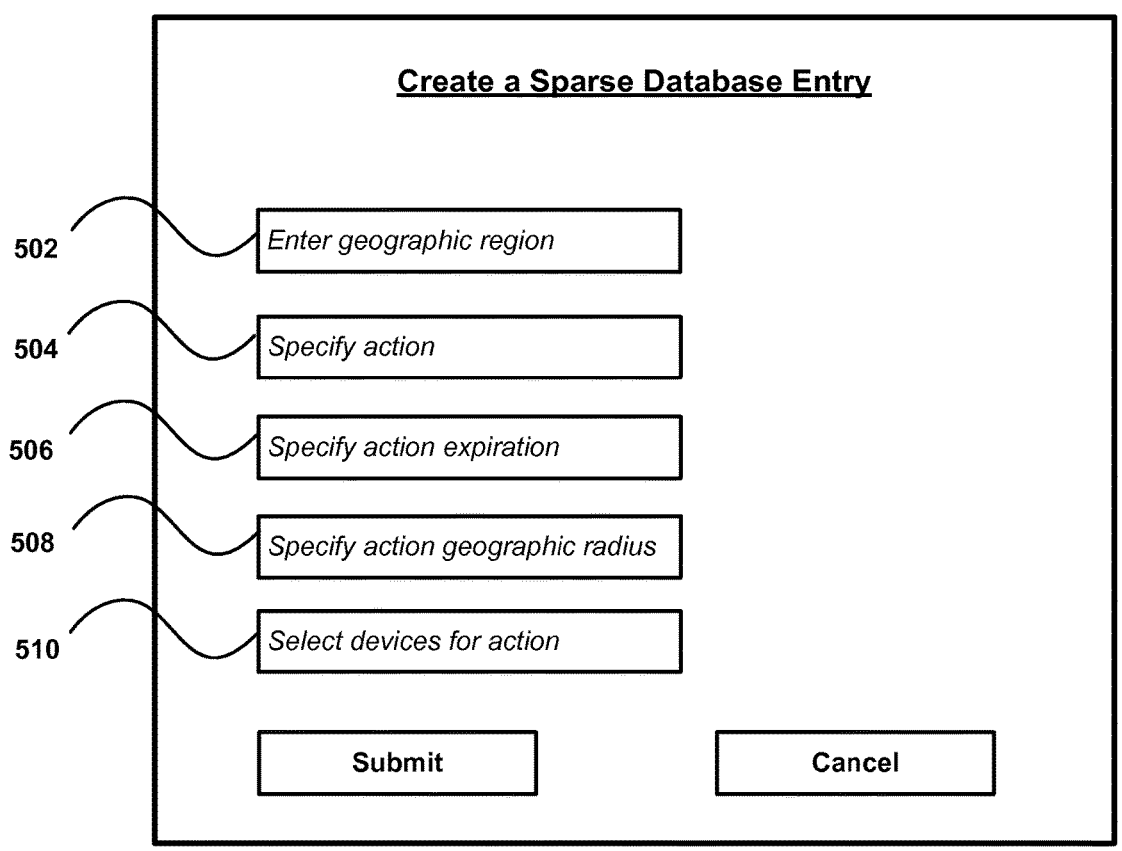
FIG. 5 illustrates an example interface that can be utilized to configure a sparse database in accordance with various embodiments.

FIG. 5 illustrates an example interface 500 that can be utilized to configure a sparse database in accordance with various embodiments. For example, the interface 500 can be a graphical user interface that is provided by a server (e.g., the content server 142), for example, through the Internet, to allow users or customers to specify customized actions to be performed on various devices that are located in specific geographic regions.

In the example of FIG. 5, the interface 500 includes several options for defining an action to be performed by devices located in a certain geographic region. For example, a user or customer can specify a geographic region 502 with which the action is to be associated. The user or customer can provide coordinates (e.g., latitude and longitude), a range of coordinates, street addresses, to name some examples. In some implementations, the user or customer can access a drop-down menu to select predefined geographic regions (e.g., the world, popular geographic regions, points of interest, etc.). The user or customer can also define any actions 504 to be performed at the specified geographic region(s). As mentioned, actions can include targeted advertisements, sending location-specific content, messages, to name some examples.

The example interface 500 also provides the user or customer with the option of specifying an expiration time period 506 after which the specified actions will no longer performed. These time periods may be specified in terms of duration (e.g., hours, days, months, years, etc.) or a specific time or date. The interface 500 also provides the user or customer with the option of specifying a geographic radius 508 that defines an area in which the action should be performed. For example, the user or customer may provide specific coordinates as the geographic region 502 and a radius of 1 kilometer. The server can then determine how many access points are needed to satisfy the coverage requirements and select appropriate access points to be included in the sparse database. The example interface 500 also allows the user or customer to associate the specified actions with certain types, makes, and/or models of devices 510 in which the action can be triggered.

Once the appropriate information has been specified, the user or customer can submit the information to be included in the sparse database to be generated by the server. The server can include the information provided in the sparse database. The sparse database will include information associating the specified action with the specified geographic region and radius, together with the specified expiration time period and device information. The sparse database will also include information identifying access points that are available within the specified geographic region and radius.

As mentioned, when a device that is utilizing the generated sparse database detects any of the access points identified in the sparse database, the device can determine the geographic region to which the detected access points corresponds (e.g., the specified geographic region) and can perform any actions associated with that geographic region.

Although FIG. 5 illustrates use of the interface 500 for creating entries for a sparse database, other approaches are possible. For example, in some embodiments, users or customers can provide data describing several sparse database entries, for example, in the form of an XML file, and these entries used in generating a sparse database.

Figure 6:
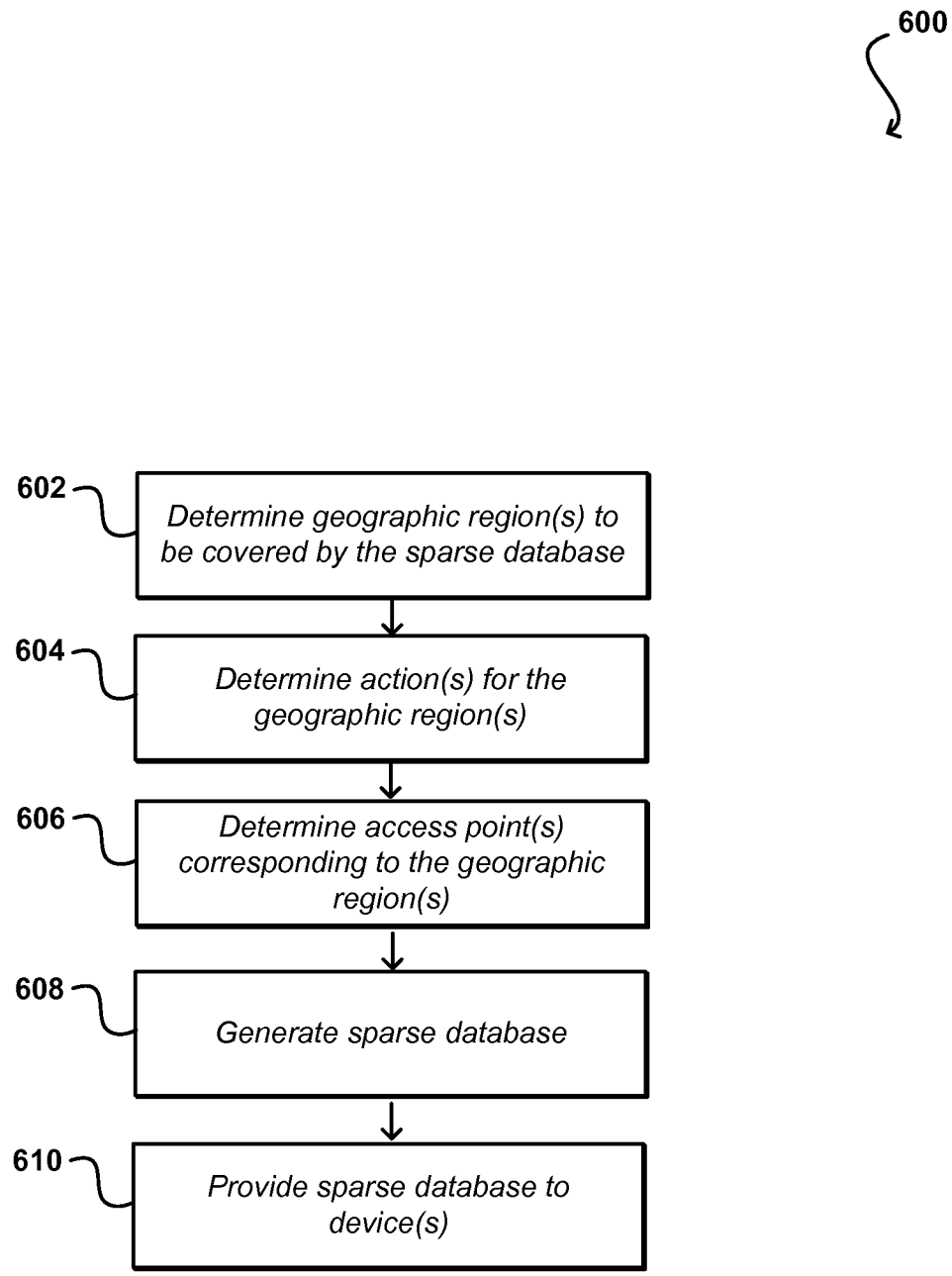
FIG. 6 illustrates an example process for generating customized access point sparse databases in accordance with various embodiments.

FIG. 6 illustrates an example process 600 for generating customized access point sparse databases in accordance with various embodiments. It should be understood that there can be additional, fewer, or alternative steps performed in similar or alternative orders, or in parallel, within the scope of the various embodiments unless otherwise stated. In this example, geographic regions for which the sparse database will cover are determined 602. As mentioned, these geographic regions can determined based on a specific user or purpose. For example, a sparse database can be generated including some or all access points that are available (e.g., detectable or available for connection) throughout the world. In some embodiments, devices can be configured to utilize the sparse database to provide offline services, such as offline maps. In some embodiments, a sparse database can be generated to include some or all access points that are available in geographic regions that are determined to be popular. Popular geographic regions can include, for example, regions often visited by a user or users, tourist destinations, transportation hubs, such as airports or train stations, etc.). Such information can be used to provide users with location-based content. For example, when a user lands at an airport in a city or country that the user has not visited, the user's device can reference the sparse database to determine its approximate geographic location and obtain content specific to that city or country (e.g., maps, travel guides, food guides, currency information, hotel reservations, transportation options, etc.). In some embodiments, a sparse database can be generated to include some or all access points that are available in geographic regions in which certain points of interest (e.g., museums, movie theatres, restaurants, etc.) are located. Such information can be used to provide users with location-based content, as described throughout this specification. In some embodiments, a sparse database can be generated to include some or all access points that are available in geographic regions for which actions have been specified.

Next, any actions to be performed 604 by devices that are physically located in the selected geographic regions are also determined. These actions may be specified by third parties or customers, for example, through the interface described in reference to FIG. 5. As mentioned, some examples of the types of actions that can be performed on the device include displaying or sending content (e.g., a message, image, advertisement), making a call (e.g., a VoIP call), playing a sound (e.g., music or tune). In one example, an action can display on a device location-specific content or information that relates to the geographic region in which the device is located. The content can include, for example, books (e.g., travel guide) relating to the geographic region in which the device is located. Access points corresponding to the selected geographic regions 606 can be determined. For example, the access points for the regions can be determined by referencing the location information for the geographic regions (e.g., coordinates) with an access point database that associates access points with respective geographic locations or regions in which those access points are available. The sparse database can be generated 608 by including information identifying access points that are available in the selected geographic regions, respective location information for the access points, any actions to be performed at certain locations and, if applicable, any expiration, geographic radius, or compatible device information for the actions. The sparse database can be provided to devices 610, as described in this specification.

Figure 7:
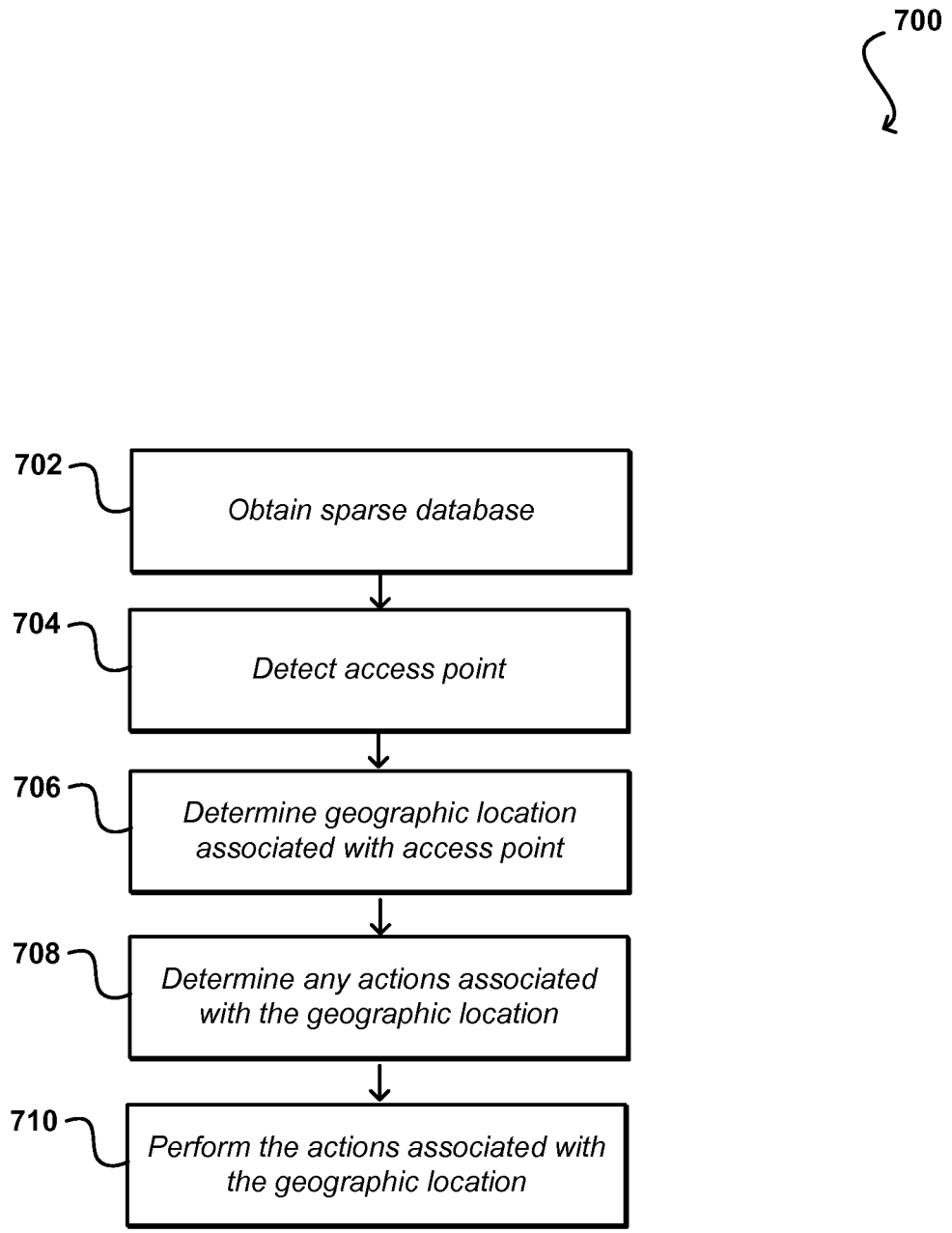
FIG. 7 illustrates an example process for a device utilizing a customized access point sparse databases in accordance with various embodiments.

FIG. 7 illustrates an example process 700 for a device utilizing a customized access point sparse databases in accordance with various embodiments. It should be understood that there can be additional, fewer, or alternative steps performed in similar or alternative orders, or in parallel, within the scope of the various embodiments unless otherwise stated. In this example, a device obtains a sparse database 702 that includes, for example, a listing of wireless access points, their respective location data, and any actions to be performed by the device when the device is able to detect or access the respective wireless access points. The device can detect a wireless access point that is included in the database 704. When the wireless access point is detected, the device can use the database to determine 706 that the wireless access point corresponds to a particular geographic location. The device can also use the database to determine any actions 708 to be performed when the device is located within the particular geographic location. In this example, the device can determine that it is located within the particular geographic location based at least in part on the detected the wireless access point and, accordingly, the device can perform the actions 710 associated with the particular geographic location.

Figure 8:
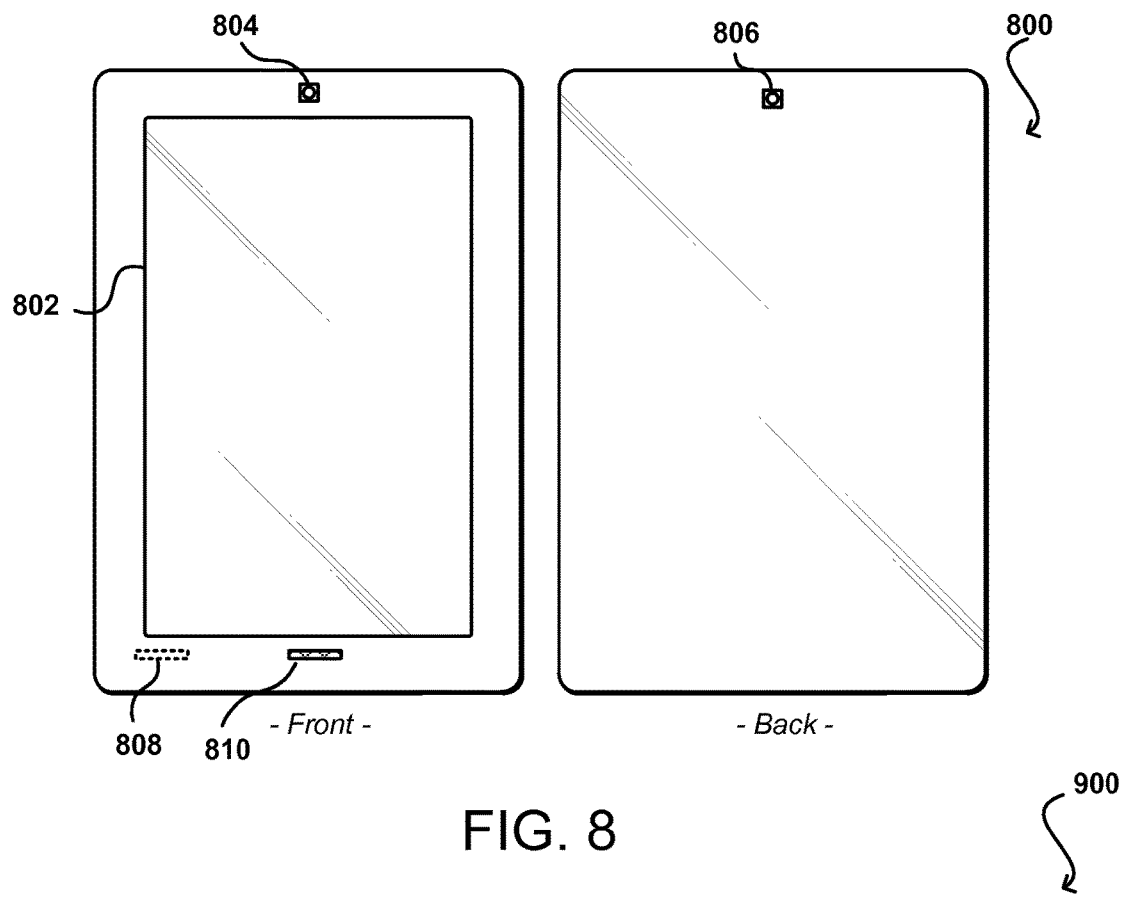
FIG. 8 illustrates another example computing device that can be used in accordance with various embodiments.

FIG. 8 illustrates an example computing device 800 that can be used to perform methods in accordance with various embodiments discussed and suggested herein. In this example, the device has a primary display screen 802 for displaying information and content to a user. The device also has two cameras 804, 806 positioned at the front and back faces of the device, respectively. It should be understood that fewer or additional cameras or other such image capture elements or sensors can be positioned at various other locations on such a device as well. In this example, each capture element is a camera capable of capturing image information over a visible and/or infrared (IR) spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices.

In this example, a light sensor can be used to determine an amount of light in a general direction of objects to be captured. At least one illumination element, such as a white light emitting diode (LED) or infrared (IR) emitter, can be used to provide illumination in a particular range of directions when, for example, there is insufficient light as determined by the light sensor. In some embodiments, there can be an emitter for each of the image capture elements, with each emitter positioned proximate the respective image capture element. Various other elements and combinations of elements can be used as well within the scope of the various embodiments as should be apparent in light of the teachings and suggestions contained herein. The device can include at least one networking component 808, enabling the device to communicate with at least one remote system or service, such as may be used to identify objects or obtain information relating to identified objects. The device also can include at least one microphone 810 or other such sensor for capturing audio data.

Figure 9:
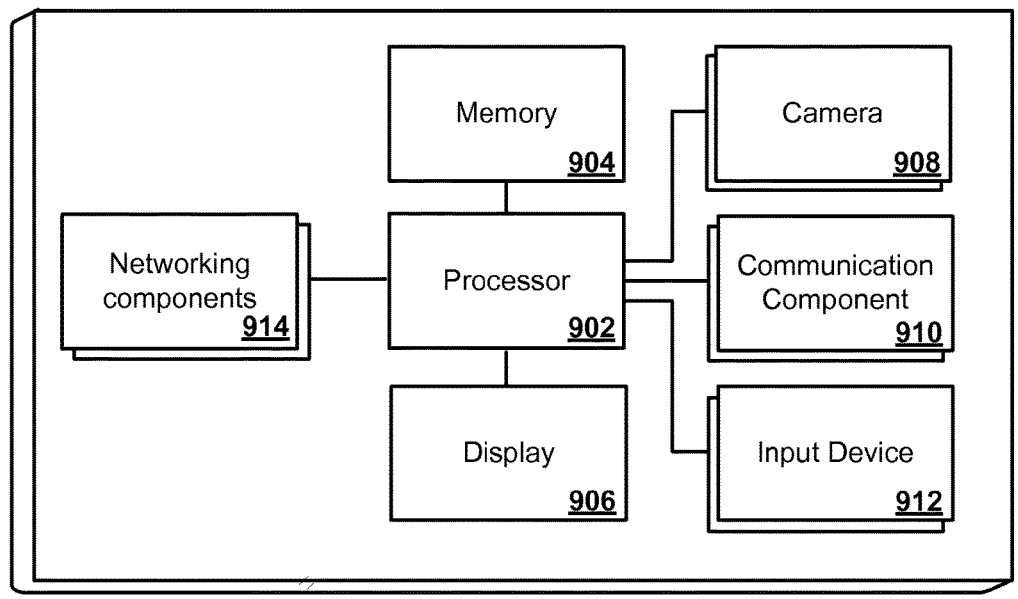
FIG. 9 illustrates an example configuration of components of a computing device such as that illustrated in FIG. 8.

In order to provide various functionality described herein, FIG. 9 illustrates an example set of basic components of a computing device 900, such as the device 800 described with respect to FIG. 8. In this example, the device includes at least one central processor 902 for executing instructions that can be stored in at least one memory device or element 904. As would be apparent to one of ordinary skill in the art, the device can include many types of memory, data storage or other type of non-transitory computer-readable storage media, such as a first data storage for program instructions for execution by the processor 902, the same or separate storage can be used for images or data, a removable storage memory can be available for sharing information with other devices, etc. The device typically will include some type of display element 906, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 908, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The example device includes at least one orientation determining component 910, such as an electronic gyroscope used to determine motion of the device for assistance in acquiring focused images. The device also can include at least one illumination element, as may include one or more light sources (e.g., white light LEDs, IR emitters, or flash lamps) for providing illumination and/or one or more light sensors or detectors for detecting ambient light or intensity, etc.

The example device can include at least one additional input device 912 able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by wireless components 914 in some embodiments. The wireless components 914 operable to communicate with other computing devices or systems using any appropriate channel used to enable devices to communicate wirelessly. Depending on the implementation, the wireless components 914 can utilize approaches for communicating using Global System for Mobile Communications (GSM), the Universal Mobile Telecommunications System (UMTS), the 3GPP Long Term Evolution (LTE) and marketed as 4G LTE, WiMax, WiFi, Bluetooth, ZigBee, and/or various other communication networks and/or standards. It should be understood that, in some implementations, the device can have one or more conventional wired communications connections as known in the art. In some embodiments, however, such a device might not include any buttons at all and might be controlled only through a combination of visual (e.g., gesture) and audio (e.g., spoken) commands such that a user can control the device without having to be in contact with the device.

Figure 10:
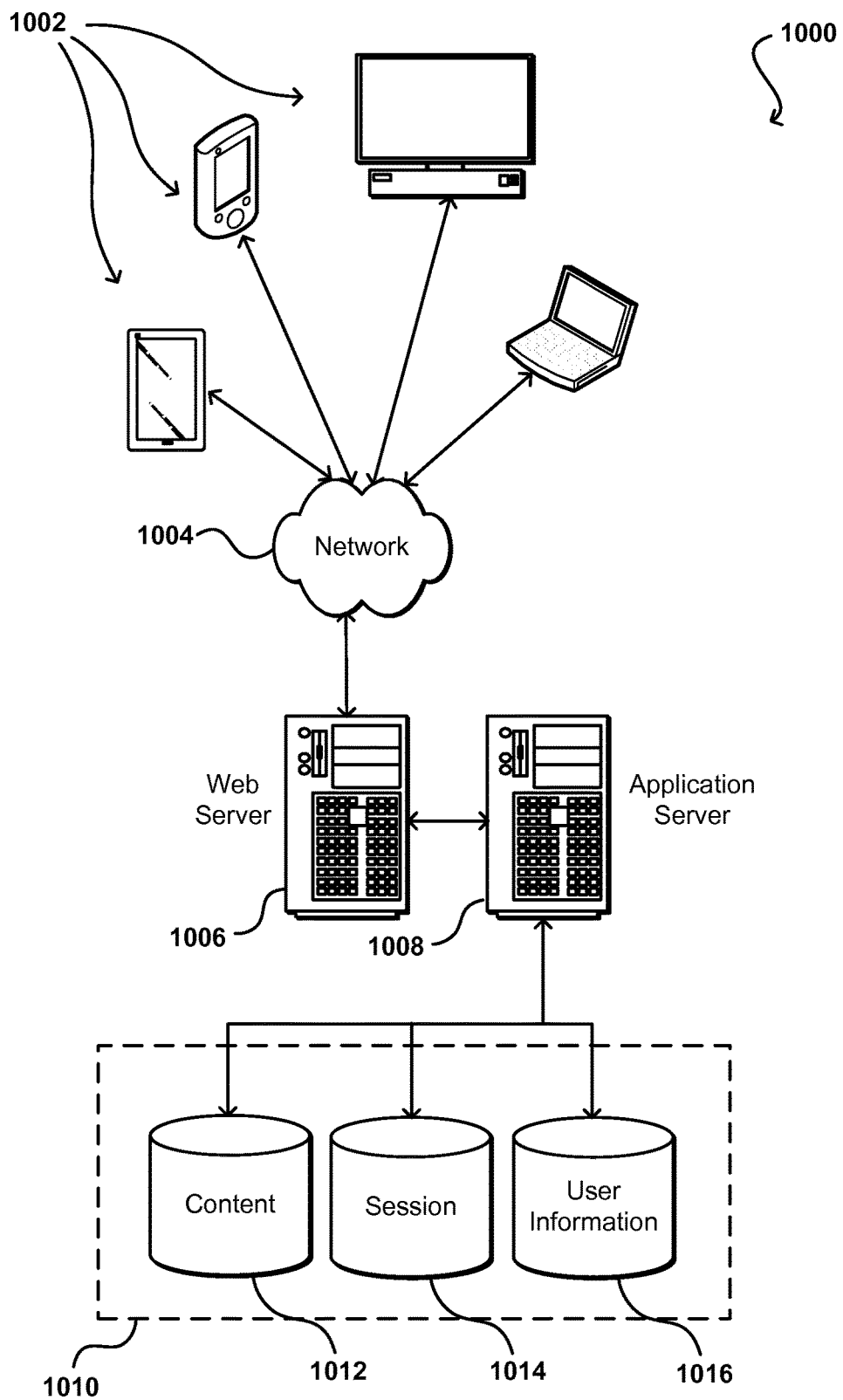
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002 (e.g., the device described in reference to FIG. 8), which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a user device, information describing a wireless access point that has been detected or accessed by the user device over a period of time, the information including a service set identification (SSID) for the wireless access point;
determining that a number of times the user device has detected or accessed the wireless access point satisfies a threshold value;
determining a geographic region in which the user device is frequently located based at least in part on the number of times satisfying the threshold value;
determining an action to be performed by the user device when the user device is located within the geographic region;
based at least in part on the number of times satisfying the threshold value, generating:
first user customized data associating the wireless access point with global positioning system (GPS) coordinates corresponding to the geographic region, and
second user customized data associating the GPS coordinates corresponding to the geographic region with the action; and
providing, at a first time, the first user customized data and the second user customized data to the user device;
storing the first user customized data and the second user customized data in a memory of the user device, wherein the first user customized data and the second user customized data is accessible by the user device for processing at a second time after the first time to determine GPS coordinates corresponding to the wireless access point and perform the action associated with the GPS coordinates at the second time when the user device detects or accesses the wireless access point at the second time.

2. The computer-implemented method of claim 1, wherein determining the action to be performed further comprises:
determining that an entity has provided an item for display on devices that are located in the geographic region, wherein the user device is able to display the item in response to the user device detecting or accessing the wireless access point at the second time.

3. A computer-implemented method, comprising:
receiving, from a computing device, information corresponding to a first wireless access point that has been detected or accessed by the computing device, the information including an identifier of the first wireless access point;
determining that an amount the computing device has detected or accessed the first wireless access point satisfies a threshold;
determining a geographic region in which the computing device is frequently located based at least in part on the amount satisfying the threshold value;
determining at least one operation to be performed by the computing device while in the geographic region;
generating first data associating the first wireless access point with the geographic region;
generating second data associating the geographic region with the at least one operation; and
providing, at a first time, the first data and the second data to the computing device for storage on the computing device,
wherein the first data and second data are accessible by the computing device for processing at a second time after the first time to determine the geographic region corresponding to the first wireless access point and perform the at least one operation associated with the geographic region when the computing device is located within the geographic region.

4. The computer-implemented method of claim 3, wherein generating the first data associating the first wireless access point with the geographic region and generating the second data associating the geographic region with the at least one operation further comprises:
associating the first wireless access point with the at least one operation.

5. The computer-implemented method of claim 3, wherein determining the at least one operation further comprises:
selecting the at least one operation that is associated with the geographic region.

6. The computer-implemented method of claim 3, wherein the computing device is associated with a user, and wherein determining the geographic region in which the computing device is frequently located is further based at least in part on a mailing address associated with the user, wherein the mailing address is stored in a user profile.

7. The computer-implemented method of claim 3, wherein generating the first data associating the first wireless access point with the geographic region and generating the second data associating the geographic region with the at least one operation further comprises:
obtaining information identifying a plurality of second wireless access points located in the geographic region; and
associating each of the plurality of second wireless access points with the geographic region;
wherein, the computing device is instructed to perform the at least one operation when the computing device detects or accesses any one of the plurality of second wireless access points.

8. The computer-implemented method of claim 7, wherein associating each of the plurality of second wireless access points with the geographic region further comprises:
associating a respective service set identification (SSID) for each of the plurality of second wireless access points with the geographic region;
wherein, the computing device is instructed to perform the at least one operation when the computing device detects or accesses any one of the respective SSIDs for the plurality of second wireless access points.

9. The computer-implemented method of claim 3, wherein the at least one geographic location includes one or more points of interest (POIs) and each of the one or more POIs has an associated WiFi access point, and wherein determining the at least one operation to be performed further comprises:
 associating the at least one operation with a first WiFi access point associated with a first POI of the one or more POIs.

10. The computer-implemented method of claim 3, wherein determining the at least one operation to be performed further comprises:
 receiving, from an advertiser, third data describing the at least one operation to be performed in the geographic region.

11. The computer-implemented method of claim 3, wherein the at least one operation further comprises at least one of displaying content, displaying one or more advertisements, displaying travel directions, downloading content, sending a message, placing a voice call, or playing a sound.

12. The computer-implemented method of claim 3, wherein determining the geographic region further comprises:
 obtaining a listing of wireless access points and their corresponding location data, the listing including the first wireless access point; and
 determining that the first wireless access point is located in the geographic region based on the location data for the first wireless access point.

13. The computer-implemented method of claim 3, wherein the at least one operation is associated with (i) an expiration time period after which the at least one operation is no longer able to be performed by the computing device or (ii) a maximum number of times the at least one operation is able to be performed by the computing device.

14. The computer-implemented method of claim 3, further comprising:
 determining a radius within which the operation is performable, the radius defining an area of the geographic region.

15. A computing device, comprising:
at least one processor;
memory including instructions that, when executed by the at least one processor, cause the computing device to:
 transmit information corresponding to a first wireless access point that has been detected or accessed by the computing device, the information including an identifier of the first wireless access point;
 receive first data associating the first wireless access point with a geographic region and second data associating the geographic region with an operation, wherein the first data and second data are based at least in part on an amount the computing device has detected or accessed the first wireless access point satisfying a threshold;
 store, at a first time, the first data and the second data;
 detect, at a second time after the first time, the first wireless access point;
 determine, based at least in part on detecting the first wireless access point and the first data, that the computing device is located in the geographic region;
 determine, based at least in part on the second data, that the geographic region is associated with the operation; and
 perform the operation.

16. The computing device of claim 15, wherein to determine that the computing device is located in the geographic region, the instructions further cause the processor to:
 determine that the computing device is located in the geographic region based at least in part upon detecting the first wireless access point.

17. The computing device of claim 16, wherein the instructions further cause the processor to:
 detect or access a second wireless access point; and
 perform the operation during a first time interval and another operation during a second time interval.

18. The computing device of claim 15, wherein the operation is associated with an expiration time period, and wherein the instructions cause the processor to:
 determine that the expiration time period has elapsed; and
 cease performing of the operation.

19. The computing device of claim 15, wherein the instructions further cause the processor to:
 determine that the computing device is approved to perform the operation based on the second data, wherein the second data includes information describing which devices are approved to perform the operation.

* * * * *